United States Patent [19]

Gloesener et al.

[11] Patent Number: 5,214,092
[45] Date of Patent: May 25, 1993

[54] IMPACT-RESISTANT COMPOSITIONS BASED ON VINYL CHLORIDE POLYMERS AND THEIR USE

[75] Inventors: Daniel Gloesener, Sart d'Avril-Fernelmont; Philippe Lamberty, Brussels, both of Belgium

[73] Assignee: Solvay S.A., Brussels, Belgium

[21] Appl. No.: 826,782

[22] Filed: Jan. 28, 1992

[30] Foreign Application Priority Data

Feb. 1, 1991 [BE] Belgium ............................. 09100099

[51] Int. Cl.$^5$ ................................................ C08J 3/00
[52] U.S. Cl. ..................................... 524/425; 524/300; 524/504; 523/200; 523/71
[58] Field of Search ............... 524/425, 300, 504; 523/200

[56] References Cited

U.S. PATENT DOCUMENTS

| | | | |
|---|---|---|---|
| 3,853,968 | 12/1974 | Bortnick | 525/82 |
| 3,960,986 | 6/1976 | Heichele et al. | 525/222 |
| 3,996,173 | 12/1976 | Heichele et al. | 524/425 |
| 4,185,048 | 1/1980 | Buning et al. | 525/80 |
| 4,373,051 | 2/1983 | Memering | 524/427 |
| 4,383,071 | 5/1983 | Lawson et al. | 525/317 |
| 4,386,169 | 5/1983 | Artur et al. | 523/200 |
| 4,436,861 | 3/1984 | Ushioda et al. | 524/425 |
| 4,507,414 | 3/1985 | McRowe et al. | 524/425 |
| 4,752,639 | 6/1988 | Haller et al. | 525/74 |
| 4,778,850 | 10/1988 | Lindner et al. | 525/80 |

FOREIGN PATENT DOCUMENTS

| | | | |
|---|---|---|---|
| 2231695 | 12/1974 | France. | |
| 108195 | 10/1974 | Japan | 524/504 |
| 1551297 | 8/1979 | United Kingdom. | |

*Primary Examiner*—Paul R. Michl
*Assistant Examiner*—Olga Asinovsky
*Attorney, Agent, or Firm*—Spencer, Frank & Schneider

[57] ABSTRACT

Impact-resistant compositions based on vinyl chloride polymers and their use for profile extrusion, comprising, by way of vinyl chloride polymers: (a) from 40 to 60 parts of graft copolymer of vinyl chloride with lightly crosslinked polybutyl acrylate, (b) from 10 to 50 parts of graft copolymer of vinyl chloride with an ethylene/vinyl acetate copolymer and (c) from 10 to 50 parts of unmodified vinyl chloride polymer per 100 parts by weight in total of vinyl chloride polymers, as well as, by way of a reinforcing filler, (d) from 4 to 10 parts of calcium carbonate in fatty acid-coated particles of average diameter less than 1 μm per 100 parts by weight of vinyl chloride polymers.

10 Claims, No Drawings

IMPACT-RESISTANT COMPOSITIONS BASED ON VINYL CHLORIDE POLYMERS AND THEIR USE

The present invention relates to impact-resistant compositions based on vinyl chloride polymers and to their use. It relates more especially to compositions based on vinyl chloride polymers comprising vinyl chloride polymers grafted onto reinforcing polymers, as well as to the use of these compositions for profile extrusion.

For the extrusion of polyvinyl chloride profiles such as profiles for frames for outdoor use, it is well known to make use of compositions comprising reinforcing polymers, generally elastomeric in nature, such as, for example, alkyl acrylate polymers or alternatively ethylene/vinyl acetate copolymers. These compositions are obtained either by external mixing of polyvinyl chloride with reinforcing polymers of the abovementioned type, or by the use of polyvinyl chloride modified "in situ" by polymerisation with grafting of vinyl chloride onto such reinforcing polymers. Irrespective of the method of incorporation of the reinforcing polymers, compositions based on polyvinyl chloride which are specifically recommended for the extrusion of profiles for frames for outdoor use generally comprise from 6 to 10 parts by weight approximately of reinforcing polymer per 100 parts by weight of the total of polymeric constituents of the composition, as well as a few per cent of fatty acid-coated calcium carbonate of fine particle size. Such compositions usually make it possible to comply with the quality marks for window frames laid down in certain countries, such as, for example, the German quality mark RAL laying down an impact strength with a single U-shaped notch on a pressed plaque 4 mm thick (according to DIN Standard 53453) of greater than 20 kJ/$m^2$ and an impact strength with a double V-shaped notch (according to DIN Standard 53753) of greater than 40 kJ/$m^2$. Nevertheless, the reinforcing polymers generally contribute to reducing the ageing resistance and the rigidity of the compositions based on polyvinyl chloride in which they are incorporated.

The object of the present invention is to obtain impact-resistant compositions based on vinyl chloride polymers having superior efficacy and consequently enabling at least equivalent performance to be achieved from the standpoint of impact resistance with a lower overall content of reinforcing polymers.

To this end, the present invention relates to impact-resistant compositions based on vinyl chloride polymers, characterised in that they comprise, by way of vinyl chloride polymers:

(a) from 40 to 60 parts of graft copolymer of vinyl chloride with lightly crosslinked polybutyl acrylate containing from 2 to 10% by weight of lightly crosslinked polybutyl acrylate, (b) from 10 to 50 parts of graft copolymer of vinyl chloride with an ethylene/vinyl acetate copolymer containing from 0.5 to 7% by weight of ethylene/vinyl acetate copolymer having an intrinsic viscosity, measured at 20° C. in m-xylene, of between approximately 0.05 and 0.10 l/g, (c) from 10 to 50 parts of unmodified vinyl chloride polymer per 100 parts by weight in total of vinyl chloride polymers, and, by way of a reinforcing filler:

(d) from 4 to 10 parts of calcium carbonate in fatty acid-coated particles of average diameter less than 1 μm per 100 parts by weight of vinyl chloride polymers.

The graft copolymers of vinyl chloride with lightly crosslinked polybutyl acrylate, hereinafter designated by the term "polymers (a)", as well as the graft copolymers of vinyl chloride with an ethylene/vinyl acetate copolymer, hereinafter designated by the term "polymers (b)", constitute polymers which are known as such.

Lightly crosslinked polybutyl acrylate is understood to denote polybutyl acrylates having a degree of crosslinking of less than approximately 1%. The crosslinking is obtained by employing, in the polymerisation of butyl acrylate, a small amount of a comonomer comprising several ethylenically unsaturated bonds, such as, for example, diallyl phthalate or diallyl maleate. An advantageous method of manufacture of the polymers (a), consisting in grafting vinyl chloride in aqueous suspension onto a crosslinked polybutyl acrylate latex, is described in Patent DE-B-1,090,857 (BASF), which is incorporated herein by way of reference.

Polymers (a) to which preference is given contain from 4 to 8% by weight approximately of lightly crosslinked polybutyl acrylate.

Ethylene/vinyl acetate copolymer is understood to denote copolymers containing from 50 to 80% by weight of ethylene, the remainder consisting of vinyl acetate. An advantageous method of manufacture of the polymers (b), which consists in predispersing the ethylene/vinyl acetate copolymer in vinyl chloride in the presence of water before subjecting the vinyl chloride to a polymerisation in aqueous suspension, is described in Patent Application EP-A-0,074,139 (SOLVAY & Cie), which is also corporated herein by way of reference.

The polymers (b) to which preference is given contain from 1.5 to 5% by weight approximately of ethylene/vinyl acetate copolymer.

Unmodified vinyl chloride polymer, hereinafter designated by the term "polymer (c)", is understood to denote vinyl chloride polymers not containing a reinforcing polymer. The polymers (c) to which preference is given consist of vinyl chloride homopolymers. By way of examples of such homopolymers, there may be mentioned the vinyl chloride homopolymers obtained by polymerisation in aqueous suspension possessing a K-value (measured at 25° C. in cyclohexanone in the proportion of 5 g/l) ranging from 60 to 70, and more especially from 64 to 70, as well as the vinyl chloride homopolymers obtained by polymerisation in aqueous emulsion possessing a K-value ranging from 68 to 80, and still more especially from 72 to 76. Polymers (c) which are most especially preferred are the vinyl chloride homopolymers obtained by polymerisation in aqueous emulsion having a K-value (measured under the abovementioned conditions) ranging from 72 to 76.

Calcium carbonate in fatty acid-coated particles is understood to denote calcium carbonates in particles coated with a fatty acid containing from 10 to 24 carbon atoms, and mixtures thereof. Preferably, the fatty acids contain from 12 to 22 carbon atoms. Most commonly, these fatty acids consist of mixtures of stearic and palmitic acids.

Preference is, moreover, given to natural or precipitated calcium carbonates in particles of average diameter between 0.05 and 0.2 μm, more especially between 0.05 and 0.1 μm.

A surprising aspect of the compositions according to the invention lies in the fact that, for identical overall contents of reinforcing agents, they give rise to very considerably greater impact strengths with a single U-shaped notch and with a double V-shaped notch than those of compositions exclusively containing polybutyl acrylate by way of a reinforcing agent. The compositions according to the invention are, moreover, easier to utilise and possess a weldability (measured on the basis of the static tensile strength of welded assemblies) which is relatively insensitive to variations in the welding temperature.

Compositions according to the invention which are preferred comprise, by way of vinyl chloride polymers:
(a) from 45 to 55 parts of graft copolymer of vinyl chloride with lightly crosslinked polybutyl acrylate,
(b) from 20 to 40 parts of graft copolymer of vinyl chloride with an ethylene/vinyl acetate copolymer,
(c) from 20 to 40 parts of unmodified vinyl chloride polymer per 100 parts by weight of vinyl chloride polymers and, by way of a reinforcing filler,
(d) from 5 to 8 parts of calcium carbonate per 100 parts by weight of vinyl chloride polymers.

According to another preferred aspect of the invention, the sum of the contents of lightly crosslinked polybutyl acrylate and of ethylene/vinyl acetate copolymer in the compositions is less than 6 parts and, moreover, greater than 2 parts per 100 parts by weight in total of vinyl chloride polymers. Especially preferred compositions are those in which the content of lightly crosslinked polybutyl acrylate amounts to at least 2 parts and the content of ethylene/vinyl acetate copolymer to at least 0.25 part, the sum of the contents of lightly crosslinked polybutyl acrylate and of ethylene/vinyl acetate copolymer not exceeding 4.5 parts by weight per 100 parts by weight in total of vinyl chloride polymers.

Apart from the characteristic vinyl chloride polymers and reinforcing filler described above, the compositions according to the invention can contain all common ingredients used in compositions based on vinyl chloride polymers, such as heat stabilisers, agents facilitating utilisation, lubricants, pigments and the like. The compositions according to the invention may be utilised in the form of powders or granules, preference being given to the latter.

The compositions according to the invention are especially suitable for profile extrusion, and still more especially that of profiles for frames for outdoor use. The use of the compositions according to the invention for profile extrusion, and still more especially for that of frames for outdoor use, constitutes another aspect of the present invention.

The examples which follow are intended for illustration of the invention.

Example 1 illustrates a composition according to the invention comprising in total 3.5 parts of reinforcing polymers, namely 3 parts of lightly crosslinked polybutyl acrylate (present in the form of a graft copolymer of vinyl chloride with a lightly crosslinked polybutyl acrylate) and 0.5 part of ethylene/vinyl acetate copolymer (present in the form of a copolymer of vinyl chloride grafted onto an ethylene/vinyl acetate copolymer).

Examples 2 and 3, given by way of comparison, comprise exclusively, by way of a reinforcing polymer, 3 and 3.9 parts, respectively, of lightly crosslinked polybutyl acrylate (present in the form of a copolymer of vinyl chloride grafted onto a lightly crosslinked polybutyl acrylate).

Example 4 illustrates a composition according to the invention comprising in total 4 parts of reinforcing polymers, namely 3.6 parts of lightly crosslinked polybutyl acrylate (present in the form of a graft copolymer of vinyl chloride with a lightly crosslinked polybutyl acrylate) and 0.4 part of ethylene/vinyl acetate copolymer (present in the form of a copolymer of vinyl chloride grafted onto an ethylene/vinyl acetate copolymer).

The vinyl chloride polymers employed in the examples are as follows:
polymer (a): copolymer obtained by polymerisation in aqueous suspension of vinyl chloride in the presence of a lightly crosslinked polybutyl acrylate latex (degree of crosslinking <1%) containing 94 parts by weight of polyvinyl chloride per 6 parts by weight of lightly crosslinked polybutyl acrylate;
polymer (b): copolymer or K-value equal, respectively, to 68 (Examples 1 to 3), and to 64 (Example 4) (at 25° C. in cyclohexane in the proportion of 5 g/l), obtained by polymerisation of vinyl chloride in aqueous suspension with an ethylene/vinyl acetate copolymer containing 60% by weight of ethylene, having an intrinsic viscosity, measured at 20° C. in m-xylene, amounting to 0.08 g/l, containing 98 parts by weight of polyvinyl chloride per 2 parts by weight of ethylene/vinyl acetate copolymer;
polymer (c): vinyl chloride homopolymer obtained in aqueous emulsion having a K-value (measured at 25° C. in cyclohexanone in the proportion of 5 g/l) equal to 73 (PVC-E), or in aqueous suspension having a K-value (same conditions) equal to 64 (PVC-S).

The reinforcing filler (d) consists of precipitated calcium carbonate in stearic acid-coated particles having a average diameter equal to 0.08 μm.

The compositions prepared and evaluated are as follows, the contents being expressed by weight:

|  | Example 1 | Example 2 | Example 3 | Example 4 |
|---|---|---|---|---|
| Polymeric Constituents: | | | | |
| Polymer (a) | 50 | 50 | 65 | 60 |
| Polymer (b) | 25 | | | 20 |
| Polymer (c): | | | | |
| PVC-E | 25 | 10 | 15 | 20 |
| PVC-S | | 40 | 20 | |
| Reinforcing filler (d): | 6.25 | 6.25 | 6.25 | 6.25 |
| Ingredients employed (identical in nature and in amounts in all four examples): | | | | |
| Dibasic lead phosphite | 3.5 | | | |
| Dibasic lead stearate | 1.5 | | | |
| Calcium stearate | 0.5 | | | |
| Phosphite type costabiliser | 0.25 | | | |
| Esters of fatty alcohols and acids (lubricants) | 0.6 | | | |
| Acrylic polymer facilitating utilization | 1 | | | |
| Titanium oxide | 4 | | | |

The composition according to Example 4 contains in addition

| Polyethylene waxes | 0.15 |
|---|---|

Premixes were prepared in a slow mixer, then gelled on an internal mill for approximately 2.5 minutes and discharged at 160° C. into a roll mill; the temperatures for the front and rear rolls being 150° and 145° C., respectively. A strip thereof is removed, cooled in a water tank and then transferred to a granulator.

From the granules thereby obtained, plaques were pressed under the conditions specified in DIN Standard 7748 for evaluating the Charpy impact strength with a single U-shaped notch according to DIN Standard 53453 (test pieces 50×6×4 mm).

Furthermore, profiles were extruded on a twin-taper-screw machine having an output of 120 kg/h with the following temperature profile:

| barrel | 190° C.–170° C.–150° C. |
|---|---|
| adapter | 160° C. |
| breaker plate | 165° C. |
| head | 165° C. |
| die | 185° C. |
| screw conditioning | 160° C. |

The Charpy impact strength with a double V-shaped notch was evaluated according to DIN Standard 53753 (notch radius 0.1 mm) on test pieces 3 mm thick taken from the outer face of the profiles.

On identical test pieces, the Charpy impact strength with a single V-shaped notch was evaluated according to BS Standard 2782, method 359 (for modified PVC).

Profiles were also welded under the following conditions:

| heating mirror temperature: | 265 and 245° C. |
|---|---|
| movement of the profile against the mirror: | 5.7 mm |
| movement of the profile during assembly: | 1.4 mm |
| period of the preheating of the profiles during advance against the mirror: | 15 s |
| period of the preheating of the profiles at rest against the mirror: | 20 s |
| time of application of the profiles against one another during assembly: | 40 s |
| lengths of the arms from the internal angle of the welded corner joints: | 32 cm |
| the flashes which formed during welding were not milled off. | |

The quality of the welds was evaluated by measurement of the quasi-static tensile strength of the welded corner$^S$ after thermal conditioning of the profiles for 12 hours at 23 degrees in the isothermal room in which the evaluation was performed, the conditions of the latter being detailed below:
- one of the arms of the welded corner is equipped with counter-chocks matched to the shape of the profile and placed vertically against the rigid support of the test machine. The counter-chocks are such that they avoid clamping on the rebates. The horizontal arm is at the top.
- the outside of the corner is clamped using a plunger
- the sides of the corner are clamped using another two plungers
- the test machine pushes the horizontal arm of the corner vertically upwards by means of a plunger with a circular head
- rate of thrust : 50 mm/min
- distance from the internal angle of the welded corner to the axis of thrust : 30 cm
- the peak load is noted at fracture of the corner
- the moments of inertia of the profiles are evaluated using a measurement taken by video camera and calculation with appropriate software
- the tensile strengths sigma are calculated using the following formula:

$$\text{sigma [MPa]} = P\,[N] \times d\,[\text{mm}] \times v\,[\text{mm}] / I\,[\text{mm}^4]$$

where
P : fracture load
d : distance from the internal corner to the point of thrust of the plunger (=30 cm)
v : distance from the neutral fibre of the profile to the furthest fibre subjected to traction during the test
I : moment of inertia relative to the axis corresponding to simple flexing of the profile The results of the evaluation of the Charpy impact strengths, including the standard deviation measured on 10 test pieces, and of the weldability on the basis of the static tensile strength of the welded assemblies, are recorded in the attached table.

Comparison of the results of Examples 1 and 4 according to the invention with those for the comparative Examples 2 and 3 having similar overall contents of reinforcing agents shows the appreciable superiority of the compositions according to the invention from the standpoint of the Charpy impact strengths with a single U-shaped notch, with a single V-shaped notch and with a double V-shaped notch, as well as of the weldability, which is virtually insensitive to a variation in the welding temperature as opposed to that of the compositions evaluated for purposes of comparison.

TABLE

| | Ex. 1 | Ex. 2 | Ex. 3 | Ex. 4 |
|---|---|---|---|---|
| Charpy impact strength, single U-shaped notch according to DIN Standard 53453 (kJ/m$^2$) | 50 | 32 | 33 | 51 |
| Standard deviation (kJ/m$^2$) | 8.5 | 12.3 | 13.6 | 7.5 |
| Charpy impact strength, double V-shaped notch according to DIN Standard 53753 (kJ/m$^2$) | 50 | 38 | 45 | 52.5 |
| Standard deviation (kJ/m$^2$) | 4.7 | 9.6 | 8.6 | 3.5 |
| Charpy impact strength, single V-shaped notch according to BS Standard 2782, method 359 (kJ/m$^2$) | * | 7.15** | 8.40** | * |
| Standard deviation (kJ/m$^2$) | | 0.7 | 0.7 | |
| Static tensile strength of the welded assemblies (MPa) | | | | |
| Welding temperature = 265° C. | 54 | 55 | 53 | 53 |
| Welding temperature = 245° C. | 50 | 30 | 29 | 50 |

*Fractures exclusively ductile
**Fractures exclusively brittle

We claim:
1. An impact-resistant composition, comprising per 100 parts by weight of vinyl chloride polymer:
(a) from about 40 to 60 parts of graft copolymer of vinyl chloride with lightly crosslinked polybutyl acrylate containing from about 2 to 10% by weight of lightly crosslinked polybutyl acrylate,
(b) from about 10 to 50 parts of graft copolymer of vinyl chloride with an ethylene/vinyl acetate co- polymer containing from about 0.5 to 7% by weight of ethylene/vinyl acetate copolymer having an intrinsic viscosity, measured at 20° C. in m-xylene, of between approximately 0.05 and 0.10 l/g, (c) from about 10 to 50 parts of unmodified vinyl chloride polymer per 100 parts by weight in total of vinyl chloride polymers, and (d) from about 4 to 10 parts of calcium carbonate in fatty acid-coated particles having an average diameter of less than 1 μm as a reinforcing filler.

2. The impact-resistant composition according to claim 1, wherein the vinyl chloride polymer (a) contains from 4 to 8% by weight approximately of lightly crosslinked polybutyl acrylate.

3. The impact-resistant composition according to claim 1, wherein the vinyl chloride polymer (b) contains from 1.5 to 5% by weight approximately of ethylene/vinyl acetate copolymer.

4. The impact-resistant composition according to claim 1, wherein the vinyl chloride polymer (c) consists of a vinyl chloride homopolymer.

5. The impact-resistant composition according to claim 1, comprising per 100 parts by weight of vinyl chloride polymer:

(a) from about 45 to 55 parts of graft copolymer of vinyl chloride with lightly crosslinked polybutyl acrylate, (b) from about 20 to 40 parts of graft copolymer of vinyl chloride with an ethylene/vinyl acetate copolymer, (c) from about 20 to 40 parts of unmodified vinyl chloride polymer per 100 parts by weight in total of vinyl chloride polymers, and (d) from about 5 to 8 parts of calcium carbonate as a reinforcing filler.

6. The impact-resistant composition according to claim 1, wherein the sum of the contents of lightly crosslinked polybutyl acrylate and of ethylene/vinyl acetate copolymer is less than 6 parts per 100 parts by weight of the vinyl chloride polymers.

7. The impact-resistant composition according to claim 1, wherein the sum of the contents of lightly crosslinked polybutyl acrylate and of ethylene/vinyl acetate copolymer is greater than 2 parts per 100 parts by weight of the vinyl chloride polymers.

8. The impact-resistant composition according to claim 1, wherein the content of lightly crosslinked polybutyl acrylate amounts to at least about 2 parts and the content of ethylene/vinyl acetate copolymer to at least about 0.25 part, the sum of the contents of lightly crosslinked polybutyl acrylate and of ethylene/vinyl acetate copolymer not exceeding about 4.5 parts by weight per 100 parts by weight in total of vinyl chloride polymers.

9. A profile extrusion made of an impact-resistant composition based on vinyl chloride polymers, the composition comprising, by way of vinyl chloride polymers:

(a) from 40 to 60 parts of graft copolymer of vinyl chloride with lightly crosslinked polybutyl acrylate containing from 2 to 10% by weight of lightly crosslinked polybutyl acrylate, (b) from 10 to 50 parts of graft copolymer of vinyl chloride with an ethylene/vinyl acetate copolymer containing from 0.5 to 7% by weight of ethylene/vinyl acetate copolymer having an intrinsic viscosity, measured at 20° C. in m-xylene, of between approximately 0.05 and 0.10 l/g, (c) from 10 to 50 parts of unmodified vinyl chloride polymer per 100 parts by weight in total of vinyl chloride polymers, and, by way of a reinforcing filler:

(d) from 4 to 10 parts of calcium carbonate in fatty acid-coated particles having an extreme diameter of less than 1 μm per 100 parts by weight of vinyl chloride polymers.

10. A frame for outdoor use comprising a profile extrusion according to claim 9.

* * * * *